US009002883B1

(12) United States Patent
Kirmse

(10) Patent No.: US 9,002,883 B1
(45) Date of Patent: Apr. 7, 2015

(54) PROVIDING AGGREGATED STARTING POINT INFORMATION

(71) Applicant: Google Inc., Mountain View, CA (US)

(72) Inventor: Andrew Kirmse, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/071,008

(22) Filed: Nov. 4, 2013

Related U.S. Application Data

(63) Continuation of application No. 13/223,917, filed on Sep. 1, 2011, now Pat. No. 8,583,684.

(51) Int. Cl.
G06F 7/00 (2006.01)
G06F 17/30 (2006.01)
G06Q 30/02 (2012.01)

(52) U.S. Cl.
CPC .................................. G06Q 30/0205 (2013.01)

(58) Field of Classification Search
CPC .............. G06F 27/30; G06F 27/30867; G06F 27/30545; G06F 27/30575; G06F 27/30864
See application file for complete search history.

(56) References Cited

U.S. PATENT DOCUMENTS

| 7,215,280 | B1 | 5/2007 | Percy et al. |
| 7,251,558 | B1 | 7/2007 | McGrath |
| 7,769,740 | B2 | 8/2010 | Martinez et al. |
| 7,778,874 | B1 | 8/2010 | Saunders |
| 8,001,004 | B2 * | 8/2011 | Protheroe et al. .......... 705/14.69 |
| 8,073,460 | B1 | 12/2011 | Scofield et al. |
| 2002/0111172 | A1 | 8/2002 | DeWolf et al. |
| 2004/0153664 | A1 | 8/2004 | Rossler et al. |
| 2004/0203901 | A1 | 10/2004 | Wilson et al. |
| 2006/0074751 | A1 | 4/2006 | Kline et al. |
| 2007/0049296 | A1 | 3/2007 | Gupta et al. |
| 2007/0067297 | A1 | 3/2007 | Kublickis |
| 2007/0083408 | A1 | 4/2007 | Altberg et al. |
| 2007/0094067 | A1 | 4/2007 | Kumar et al. |
| 2007/0112762 | A1 | 5/2007 | Brubaker |
| 2007/0130070 | A1 | 6/2007 | Williams |
| 2007/0150464 | A1 | 6/2007 | Brave et al. |
| 2007/0239348 | A1 | 10/2007 | Cheung |
| 2007/0255831 | A1 | 11/2007 | Hayashi et al. |
| 2007/0288497 | A1 | 12/2007 | Droznin et al. |
| 2008/0005071 | A1 * | 1/2008 | Flake et al. ........................ 707/3 |
| 2008/0120186 | A1 | 5/2008 | Jokinen et al. |
| 2008/0147498 | A1 * | 6/2008 | Chao et al. ...................... 705/14 |
| 2008/0268876 | A1 | 10/2008 | Gelfand et al. |
| 2008/0288355 | A1 | 11/2008 | Rosen |

(Continued)

OTHER PUBLICATIONS

"Hyper-Local, Directions-Based Ranking of Places" [online], Stanford University Info Lab, 2011, [retrieved on Sep. 1, 2011]. Retrieved from the Internet: <URL: http://ilpubs.stanford.edu:8090/994/>.

Primary Examiner — Robert Beausoliel, Jr.
Assistant Examiner — Nicholas Allen
(74) Attorney, Agent, or Firm — Dority & Manning, P.A.

(57) ABSTRACT

Methods, systems, and computer program products are provided for providing aggregated starting point information. One example method includes identifying a location associated with an entity, identifying, from navigation information query logs, starting points for navigation information that includes an ending point in a predefined vicinity of the location associated with the entity, aggregating information associated with the starting points, and providing aggregated starting point information to the entity.

16 Claims, 4 Drawing Sheets

(56) References Cited

U.S. PATENT DOCUMENTS

| | | |
|---|---|---|
| 2009/0027223 A1 | 1/2009 | Hill |
| 2009/0070186 A1 | 3/2009 | Buiten et al. |
| 2009/0089151 A1* | 4/2009 | Protheroe et al. .............. 705/10 |
| 2009/0119179 A1* | 5/2009 | Kolve et al. .................... 705/14 |
| 2009/0125321 A1* | 5/2009 | Charlebois et al. ............... 705/1 |
| 2009/0138337 A1* | 5/2009 | Moukas et al. ................. 705/10 |
| 2009/0144130 A1* | 6/2009 | Grouf et al. .................... 705/10 |
| 2009/0164459 A1 | 6/2009 | Jennings et al. |
| 2009/0192929 A1* | 7/2009 | Hoeflinger et al. ............. 705/35 |
| 2009/0222329 A1* | 9/2009 | Ramer et al. ................... 705/10 |
| 2009/0234711 A1* | 9/2009 | Ramer et al. ................... 705/10 |
| 2009/0240568 A1 | 9/2009 | Ramer et al. |
| 2009/0240586 A1* | 9/2009 | Ramer et al. ................... 705/14 |
| 2009/0299857 A1 | 12/2009 | Brubaker et al. |
| 2010/0042615 A1 | 2/2010 | Rinearson |
| 2010/0088179 A1 | 4/2010 | Desai et al. |
| 2010/0130240 A1 | 5/2010 | Hart |
| 2010/0131304 A1* | 5/2010 | Collopy et al. .................... 705/4 |
| 2010/0169175 A1* | 7/2010 | Koran ........................ 705/14.45 |
| 2010/0185509 A1 | 7/2010 | Higgins et al. |
| 2010/0324989 A1* | 12/2010 | Etchegoyen ............... 705/14.45 |
| 2011/0022540 A1 | 1/2011 | Stern et al. |
| 2011/0055005 A1 | 3/2011 | Lang |
| 2011/0078000 A1* | 3/2011 | Ma et al. ......................... 705/10 |
| 2011/0078018 A1* | 3/2011 | Chunilal .................... 705/14.48 |
| 2011/0082752 A1 | 4/2011 | Dube et al. |
| 2011/0125572 A1* | 5/2011 | Cantu-Paz et al. ......... 705/14.43 |
| 2011/0208736 A1* | 8/2011 | Fitzpatrick et al. ........... 707/736 |
| 2012/0066066 A1 | 3/2012 | Jain et al. |
| 2012/0109942 A1 | 5/2012 | Epshtein et al. |
| 2012/0149309 A1 | 6/2012 | Hubner et al. |
| 2012/0250540 A1 | 10/2012 | Smartt et al. |

\* cited by examiner

FIG. 2

Information Request

- Address: 123 Main Street — 202
- Region: ABC
- Budget: $1,000 — 210
- Distance to Address: Within 1 Mile — 206
- Time of Request: Within 1 Month — 208
- 204

Demographics
- Age: 18-35 — 212
- Gender: — 214
- Income: — 216

Submit — 220

Aggregated Starting Point Information

- Recommended Budget $650 — 312
- Recommended Budget $200 — 314
- Recommended Budget $150 — 316

- 302: ABC, 65%
- 304: DEF, 20%
- 306: XYZ, 15%

Region

300

PROVIDING AGGREGATED STARTING POINT INFORMATION

BACKGROUND

This specification generally relates to information presentation.

Web sites have been configured to generate directions for users. Interacting with such web sites, users can enter a starting address and a destination address to receive maps and directions to the destination. Some mobile-based systems include Global Positioning System (GPS) technology that can determine a user's current location and can provide directions from the current location to a preferred destination.

SUMMARY

In general, one innovative aspect of the subject matter described in this specification may be embodied in methods, systems, and computer program products for providing aggregated starting point information. One example method includes identifying a location associated with an entity, identifying, from navigation information query logs, starting points for navigation information that includes an ending point in a predefined vicinity of the location associated with the entity, aggregating information associated with the starting points, and providing aggregated starting point information to the entity.

In general, another innovative aspect of the subject matter described in this specification may be embodied in computer program products that that can perform operations including identifying a location associated with an entity, identifying, from navigation information query logs, starting points for navigation information that includes an ending point in a predefined vicinity of the location associated with the entity, aggregating information associated with the starting points, and providing aggregated starting point information to the entity.

In general, another innovative aspect of the subject matter described in this specification may be embodied in systems for providing aggregated information to entities. The systems can include location identifiers, query log evaluators, information aggregators, and recommendation providers. A location identifier can identify a location associated with an entity. A query log evaluator can identify, from navigation information query logs, starting points for navigation information that includes an ending point in a predefined vicinity of the location associated with the entity. An information aggregator can aggregate information associated with the starting points. A recommendation provider can provide aggregated starting point information to the entity.

These and other embodiments may each optionally include none, one or more of the following features. In various examples the entity can be a business. The location associated with the entity can be an address. Starting points can be identified for navigation information that includes an ending point at the address. The predefined vicinity of the location associated with the entity can include a predefined area. Aggregating information can include aggregating the starting points by one or more regions. One or more demographic parameter selections can be received from the entity. Aggregating information can include filtering the information to include starting points associated with individuals having demographic attributes matching the one or more demographic parameter selections. Aggregating information can include determining a proportion of the starting points grouped in each region. Information associated with a budget for providing content to users can be received from the entity. Providing the aggregated starting point information can include providing a recommendation that the budget be divided among each region relative to the proportion of starting points grouped in each region. Demographic information associated with each region can be identified. The aggregated starting point information can include the demographic information. Information associated with an advertising budget can be received from the entity. Providing the aggregated starting point information can include providing a recommendation that a portion of the advertising budget be spent for a particular region based at least in part on a proportion of the starting points grouped in the region and based at least in part on demographic attributes of individuals within the region. The entity can be a content sponsor and providing aggregated starting point information can include providing a user interface to the content sponsor that includes a listing of top regions where customers come from when visiting the location associated with the entity. A recommendation can be provided to the content sponsor regarding spending with respect to a campaign of the content sponsor.

Particular embodiments of the subject matter described in this specification may be implemented to realize none, one or more of the following advantages. Unexpected insights may be gained regarding the locations and travel patterns of customers and potential customers. Content sponsors may be provided with information that enables them to appropriately allocate resources for distributing content to individuals. Through the provision of aggregated user information, the privacy of individuals may be maintained.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 2 shows an example user interface for requesting aggregated starting point information.

FIG. 3 shows an example user interface for providing aggregated starting point information and spending recommendations.

Like reference symbols in the various drawings indicate like elements.

DETAILED DESCRIPTION

In general, computer systems can provide aggregated starting point information from navigation information. Users can request navigation information, and the navigation information can be logged and provided to users. The logged navigation information may include a starting and an ending point (e.g., addresses, landmarks, etc.), and may include directions from the starting point to the ending point, for example. An entity such as a business, organization, or individual, for example, can request aggregated starting point information from navigation information that terminates in the vicinity of or at the entity's location (e.g., to identify where potential or actual customers come from). The entity can use such aggregated starting point information, for example, to allocate a budget for a targeted advertising campaign.

The systems discussed here may provide one or more mechanisms for collecting information about users. Users may be provided with an opportunity to opt in/out of programs that may collect personalized information. For example, a user may receive notice of what data may be collected and how such data may be used or retained, subject to the user's express permission. In addition, certain data may be anonymized in one or more ways before it is stored or used, so that personally identifiable data is removed.

Figure 1:
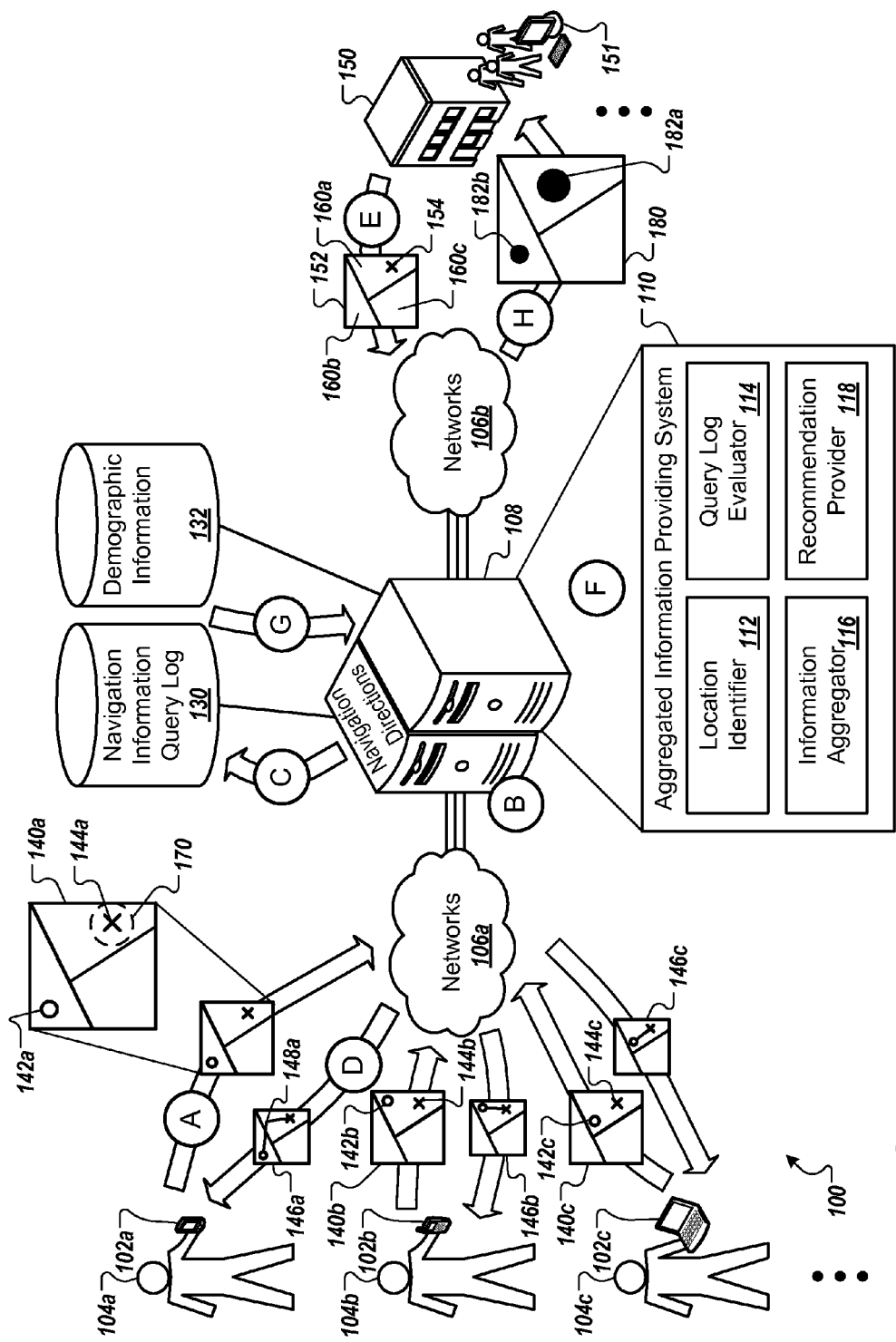
FIG. 1 is a diagram of an example system that can provide aggregated starting point information from navigation information.

FIG. 1 is a diagram of an example system 100 that can provide aggregated starting point information from navigation information. FIG. 1 also illustrates an example flow of data within the system 100 during states (A) to (H), where the states (A) to (H) may occur in the illustrated sequence, or they may occur in a sequence that is different than in the illustrated sequence. For example, two or more of the states (A) to (H) may occur concurrently.

In further detail, the system 100 includes one or more client computing devices 102 (each operated by a corresponding user 104) that communicate over one or more networks 106 with one or more computing servers 108. The networks 106 may include a wireless cellular network, a wireless local area network (WLAN) or WiFi network, a Third Generation (3G) or Fourth Generation (4G) mobile telecommunications network, or any other suitable network or any appropriate combination thereof.

The client device(s) 102 may be any suitable type of computing device (e.g., mobile phone, smart phone, personal digital assistant, tablet computer, laptop or desktop computer, or other stationary or portable device) that includes one or more processors and computer readable media. Among other components, for example, the client device(s) 102 includes one or more processors, computer readable media that store software applications, input device(s) (e.g., touch screens, keyboards, computer mice, motion sensors, microphones, and the like), output device(s) (e.g., display screens, speakers, and the like), and communications interfaces.

The computing server(s) 108 may be configured to execute application code associated with a variety of software components (e.g., modules, objects, libraries, services, and the like), including computer instructions to perform some or all of the method steps described below. In some implementations, the computing server(s) 108 may include one or more components of an aggregated information providing system 110 described below.

The aggregated information providing system 110 can provide aggregated information to entities such as businesses, organizations and individuals, for example, and can include a location identifier 112, a query log evaluator 114, an information aggregator 116, and a recommendation provider 118. Two or more of the components 112, 114, 116, and 118 may be implemented on the same device (e.g., same computing device), or on different devices, such as devices included in a server farm or a peer-to-peer network. The aggregated information providing system 110 and server(s) 108 can be in communication with one or more data storage devices, including a navigation information query log data store 130 and a demographic information data store 132. The data stores 130, 132 can implement databases, file systems, and the like to add, remove, and maintain data used by the system 100.

Referring to the example flow of data, during state (A), users can request navigation information. For example, the user 104a can employ the client computing device 102a to submit a request 140a for directions from a starting point 142a to an ending point 144a. The starting point 142a and the ending point 144a, for example, may be addresses or landmarks entered by the user 104a into a web page or application interface presented by the client computing device 102a or otherwise designated by the user or determined by the system 100. As another example, the client computing device 102a may include location identification capabilities such as Global Positioning System (GPS) capabilities, WiFi triangulation capabilities, or other such capabilities that can automatically identify and provide the current location of the computing device 102a as the starting location 142a. As shown in the present example, the user 104b can employ the client computing device 102b to submit a request 140b for navigation information including a starting point 142b and an ending point 144b. Similarly, the user 104c can employ the client computing device 102c to submit a request 140c for navigation information including a starting point 142c and an ending point 144c.

During state (B), requests for navigation information can be received and navigation information can be generated. For example, each of the requests 140 for navigation information can be received by the computing server(s) 108 via the networks 106a. Considering the request 140a, for example, based on the included starting point 142a and ending point 144a, the computing server(s) 108 can generate navigation information 146a including a route 148a between the points 142a, 144a. The navigation information 146a may include one or more maps, turn-by-turn directions, or other location based metadata, for example. As shown in the present example, the computing server(s) 108 can similarly generate navigation information 146b, 146c for requests 140b, 140c, respectively.

During state (C), navigation information can be stored. For example, the computing server(s) 108 can provide data associated with the navigation information 146, including each of the starting point 142 and ending point 144 pairs, to the navigation information query log data store 130. In some implementations, additional information associated with navigation information may be stored. For example, information associated with one or more routes (e.g., the route 148a) between a starting and ending point may be stored. As another example, the time that the user 104a provided the request 140a for navigation information may be stored. As another example, information about the client computing device 102a used to provide the request 140a, such as model type, operating system, device applications, and other information may be stored.

In some implementations, demographic information about a user providing a request for navigation information may be stored in association with the request. For example, demographic information about the user 104a, including user profile information such as age, gender, income level, and other information provided by or inferred about the user 104a may be stored. In implementations where user profile information may be stored, for example, such information can be anonymized, generalized, and/or aggregated so that the information may not be attributed to any particular user.

During state (D), navigation information can be provided to users in response to requests. For example, the computer server(s) 108 can provide navigation information 146a via the networks 106a to the client computing device 102a for presentation to the user 104a. In the present example, the user 104a can use the route 148a defined by the navigation information 146a to navigate between the starting point 142a and the ending point 144a. As shown, navigation information

146*b*, 146*c* can be similarly provided to client computing devices 102*b*, 102*c* for presentation to users 104*b*, 104*c*, respectively.

During state (E), entities (e.g., businesses, organizations, individuals, etc.) can request aggregated starting point information from navigation information that includes an ending point at or near a location associated with the entity. For example, an entity 150 can employ a client computing device 151 to provide an information request 152 that includes a location 154. The location 154, for example, may be a physical location of the entity 150 (e.g., a storefront, an office, a campus, etc.), or a location of interest to the entity 150 such as a tourist attraction or park. To specify the location 154, for example, the entity 150 may provide geographic location information such as an address and/or geographic coordinates via an interface provided by the client computing device 151.

Locations can be identified as being included within predefined regions. In the present example, the location 154 is included in a region 160*a*, which borders region 160*b* and region 160*c*. In some implementations, regions may be defined by geographic and/or natural boundaries. For example, the regions 160*a*, 160*b*, 160*c*, may be associated with postal codes (e.g., zip codes), districts, neighborhoods, or another sort of bounded area. In some implementations, regions may be specified or created by the entity providing the request for information. For example, the regions 160*a*, 160*b*, 160*c*, may be created by the entity 150 using a map generation interface.

In some implementations, requests for information may include additional parameters, such as distance parameters, budget parameters, and/or demographic parameters. A distance parameter, for example, can be used by the entity 150 to specify that aggregated starting point information is desired for navigation information (e.g., directions) that terminates at the location 154 or terminates at an ending point within a specified distance from the location 154. A budget parameter, for example, can be used by the entity 150 to specify a campaign budget (e.g., for an advertising campaign) that includes targeting content to individuals (e.g., the users 104 and/or the general population). One or more demographic parameters, for example, can be used by the entity 150 to specify preferred demographic attributes of individuals for targeting.

During states (F) and (G), requests for aggregated starting point information can be received and processed. For example, the computing server(s) 108 can receive the information request 152 from the client computing device 151 via the networks 106*b*, and can pass the request 152 to the aggregated information providing system 110. Using the location identifier 112, for example, the system 110 can identify the location 154 associated with the entity 150.

Starting points can be identified for navigation information (e.g., directions) that includes an ending point in a predefined vicinity of a location associated with an entity. Using the query log evaluator 114, for example, the system 110 can identify starting points for navigation information that includes an ending point in a predefined vicinity of the location 154. To identify such information, for example, the query log evaluator 114 can access information associated with navigation information 146 previously provided to users 104 and stored by the navigation information query log 130. As shown in the present example, the request 140*a* for navigation information submitted by the user 104*a* includes an ending point 144*a* within a predefined vicinity 170 of the location 154. The ending point 144*a*, for example, may be at or near the location 154. Thus, in the present example, the query log evaluator 114 can identify the navigation information 146*a* provided to the user 104*a* as relevant to the information request 152 of the entity 150. Similarly, the query log evaluator 114 can identify the navigation information 146*b*, 146*c* provided to users 104*b*, 104*c*, respectively, as relevant to the information request 152.

Starting point information can be aggregated. For example, the information aggregator 116 can aggregate information associated with the navigation information 146*a*, 146*b*, and 146*c*. In some implementations, starting points included in navigation information may be aggregated by region. In the present example, the starting point 142*a* may be identified by the location identifier 112 as being within the region 160*b*, and the starting points 142*b*, 142*c* may be identified as being within the region 160*a*. Thus, in the present example, for navigation information with ending points within the vicinity 170, a greater proportion of starting points fall within the region 160*a*, a lesser proportion of starting points fall within the region 160*b*, and no starting points fall within the region 160*c*.

During state (H), aggregated starting point information can be provided to an entity. For example, aggregated starting point information 180 can be provided to the entity 150 by the aggregated information providing system 110 via the networks 106*b*. The aggregated starting point information 180 may be presented to representatives, agents, and/or employees of the entity 150, for example, via an interface of the client computing device 151. Reporting formats used for presenting such information may include spreadsheets, graphs, histograms, heat maps, or other suitable formats. In the present example, an indication 182*a* (e.g., a proportionally large graphic) can be used to represent aggregated starting points 142*b*, 142*c*, and an indication 182*b* (e.g., a proportionally small graphic) can be used to represent aggregated starting point 142*a*.

In some implementations, recommendations may be provided in association with aggregated starting point information. Based on one or more budget parameters provided by the entity 150, for example, the recommendation provider 118 can provide a recommendation that the entity 150 spend its budget based at least in part on a proportion of starting points grouped in each of the regions 160. In the present example, as a greater number of starting points are identified as being within the region 160*a* relative to the regions 160*b* and 160*c*, a proportionally greater amount of the entity's budget may be spent in the region 160*a*.

In some implementations, demographic information may be used for aggregating starting point information and/or for providing recommendations based on the aggregated starting point information. For example, navigation information provided to users 104 having demographic attributes matching one or more demographic parameters submitted by the entity 150 can be used for aggregating starting point information. As another example, demographic profiles of populations associated with each of the regions 160 can be used to increase or decrease spending amounts recommended by the recommendation provider 118, based on demographic parameters submitted by the entity 150 and/or based on a predetermined spending strategy. Demographic information, for example, may be stored and maintained by the demographic information data store 132, for example, and may include publically available data and profile data submitted by the users 104.

By analyzing aggregated information associated with starting points for navigation information that includes an ending point at or near an entity's location, the entity (e.g., a business) may gain valuable insight regarding its current or potential customers. For example, a business may assume that most or all of its customers come from an area nearby the business.

However, based on aggregated starting point information, the business may discover that a significant proportion of its customers come from a different area. By using such information, the business can improve its promotional efforts.

FIG. 2 shows an example user interface 200 for requesting aggregated starting point information. For example, the computing device 151 (shown in FIG. 1) can execute an application such as a web browser to present the user interface 200 to the entity 150. By interacting with the user interface 200, for example, the entity 150 can provide the information request 152 to the computing server(s) 108 and the aggregated information providing system 110.

The user interface 200 can include controls for specifying parameters to be used by the aggregated information provided system 110 for identifying navigation information that is relevant to an entity. For example, the entity 150 may be business such as a neighborhood coffee shop, seeking to identify where its current and/or potential customers come from. By providing information about itself and its desired customers, for example, the entity 150 can in turn receive relevant information.

The user interface 200 can include one or more controls for specifying parameters that define an entity location, or a location of interest to the entity. In the present example, a control 202 is included for specifying the entity's address (e.g., 123 Main Street). Additionally or alternatively, for example, the entity may use a control 204 for specifying its region (e.g., region ABC), such as its postal code, district, neighborhood, or other sort of region. Using a control 206 for specifying a distance to its address, for example, the entity can define a vicinity for identifying navigation information that is relevant to the entity. In some implementations, one or more mapping/graphic controls may be provided to enable the entity to define (e.g., draw) a predefined area for the vicinity. For example, a business entity may define an area such as a four square block area around its storefront location.

In the present example, an owner of the coffee shop may be interested in identifying originating locations of individuals who request navigation information (e.g., directions) that terminates near (e.g., within one mile of) its address. Such individuals may represent potential customers, for example, as they may occasionally be in the vicinity of the coffee shop and may be interested in stopping by for coffee. As another example, the coffee shop owner may be interested in identifying originating locations of individuals who request navigation information that terminates at its address, as such individuals may be actual customers.

The user interface 200 can include one or more controls for specifying parameters that define a timeframe during which individuals have requested navigation information relevant to (e.g., terminating at or in the vicinity of) a location. In the present example, a control 208 is included for specifying a timeframe (e.g., within one month) in which individuals have requested navigation information. For example, the coffee shop owner may be particularly interested in identifying originating locations of individuals who have recently requested navigation information to the coffee shop, as the shop may have recently opened for business. Other controls are possible for identifying relevant queries (such as queries at certain times of day, days of the week, etc.).

The user interface 200 can include one or more controls for specifying parameters that define a budget. In the present example, a control 210 is included for specifying a budget (e.g., one thousand dollars) for an advertising campaign. For example, the owner of the coffee shop may have a limited budget and may want to allocate the budget in an effective manner. By providing budget information to the aggregated information providing system 110 via the user interface 200, for example, the coffee shop owner can receive a recommendation for effectively allocating its budget among various regions.

The user interface 200 can include one or more controls for specifying parameters that define demographic attributes of individuals of interest to the entity. In the present example, the interface 200 includes a control 212 for specifying an age range of such individuals, a control 214 for specifying a gender, and a control 216 for specifying an income range. More, fewer, or different demographic attributes may also be specified. Entities may interact with one or more of the controls 212, 214, 216, for example, to specify demographic attributes to be used by the aggregated information providing system 110 when aggregating starting point information and/or providing recommendations. For example, the coffee shop owner may interact with the control 212 to specify an age range of eighteen to thirty-five as a target demographic, as individuals of this age range may be considered as potential customers. In the present example, the coffee shop owner may elect to not interact with controls 214 and 216, as the gender and income range of potential customers may be irrelevant to the owner.

The user interface 200 can include a control 220 for submitting specified parameters to the aggregated information providing system 110. In the present example, when the entity 150 (e.g., the coffee shop owner) interacts with (e.g., clicks) the control 220, the parameters can be provided to the aggregated information providing system 110 as the information request 152. The system 110 can use the specified parameters to identify the entity's location, to identify navigation information that includes, for example, an ending point in a predefined vicinity of the entity's location, to aggregate starting points included in the navigation information, and to provide the aggregated starting point information to the entity. In response to the information request 152, for example, the system 110 can provide the entity 150 with the aggregated starting point information 180.

FIG. 3 shows an example user interface 300 for providing aggregated starting point information and spending recommendations. For example, the computing device 151 (shown in FIG. 1) can execute an application such as a web browser to present the user interface 300 the entity 150. Via the user interface 300, for example, the entity 150 can view the aggregated starting point information 180 provided by the computing server(s) 108 and the aggregated information providing system 110.

The user interface 300 can include one or more controls for providing aggregated starting point information to representatives, agents, and/or employees of entities (e.g., businesses, organizations, individuals, etc.). Aggregated information may be provided via various reporting formats, for example, including spreadsheets, graphs, histograms, heat maps, and other suitable formats. In the present example, aggregated information is presented in the form of a report (e.g., a bar graph) which shows a proportion of starting points grouped in different regions and/or a recommendation for allocating a budget among different regions.

The user interface 300 in the present example includes presentation controls 302, 304, and 306, showing a proportion of starting points in regions "ABC", "DEF", and "XYZ", respectively, that include an ending point in a predefined vicinity of a location (e.g., a storefront) associated with the entity 150 (e.g., a coffee shop). Thus, in the present example, the coffee shop may be provided with aggregated starting point information showing that 65% of its current or potential customers come from region "ABC", 20% come from region "DEF", and 15% come from region "XYZ".

Aggregated starting point information may include a recommendation that a budget be divided among each region relative to the proportion of starting points grouped in each region. For example, the user interface 300 can include presentation controls 312, 314, and 316, for presenting spending recommendations for the regions "ABC", "DEF", and "XYZ", respectively. In the present example, based on budget information (e.g. a budget of one thousand dollars) provided by the coffee shop, the coffee shop owner may be provided with a recommendation that a portion of his or her budget (e.g., 65%, or $650) be spent in region "ABC", a portion (e.g., 20%, or $200) be spent in region "DEF", and a portion (e.g., 15%, or $150) be spent in region "XYZ".

By providing aggregated starting point information and/or recommendations, for example, the aggregated information providing system 110 can maintain the privacy of individuals while providing entities (e.g., businesses, organizations, individuals, etc.) with insight data regarding current and potential customers. In the present example, if the coffee shop happens to be located within the region "ABC", the coffee shop owner may learn that most of his or her current and potential customers come from the same region, but a significant portion come from other regions (i.e., regions "DEF" and "XYZ"). Thus, rather than focusing all promotional efforts (e.g., sponsored media, online promotion, newspapers, direct mail, etc.) within region "ABC", appropriate portions of the campaign budget may be divided among regions "DEF" and "XYZ".

Figure 4:
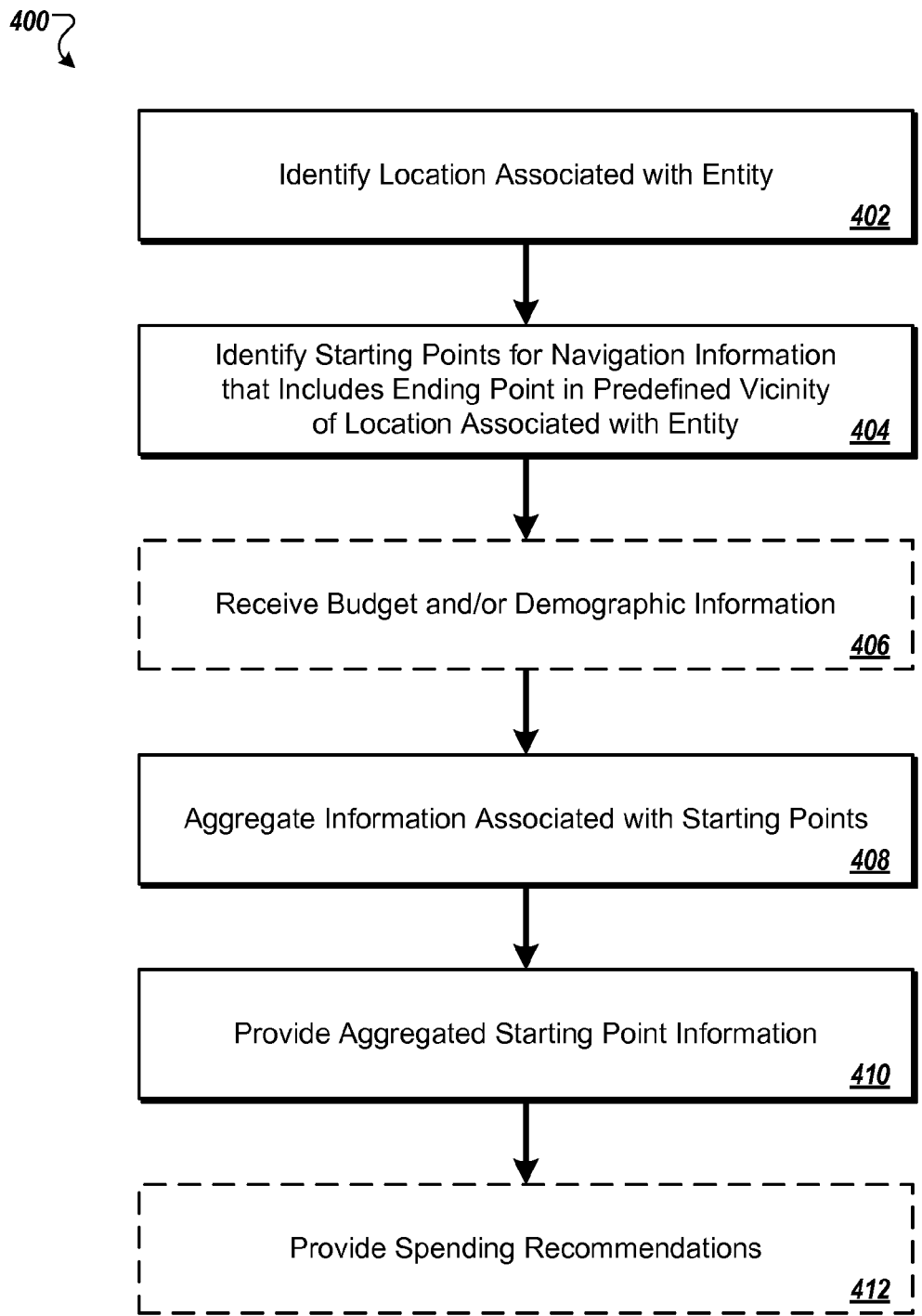
FIG. 4 is a flowchart of an example processes for providing aggregated starting point information.

FIG. 4 is a flowchart of an example process 400 for providing aggregated starting point information. In some implementations, the process 400 may be performed by the system 100 and will be described as such for the purpose of clarity. Briefly, the process 400 includes identifying a location associated with an entity, identifying starting points for navigation information that include an ending point in a predefined vicinity of the location associated with the entity, aggregating information associated with the starting points, and providing aggregated starting point information.

A location associated with an entity can be identified (402). Referring to FIG. 1, for example, the entity 150 can provide the information request 152 including information about the location 154. The location 154, for example, can be an address of the entity 150, or a location of interest to the entity 150, such as a nearby park or another sort of attraction. Upon receiving the information request 152, for example, the aggregated information providing system 110 can use the location identifier 112 to identify the location 154. In some implementations, no location request is received and instead, automated starting point information can be gathered for entities based on physical addresses or other stored information associated with an entity.

From navigation information query logs, starting points can be identified (404) for navigation information that includes an ending point in a predefined vicinity of the location associated with the entity. For example, the query log evaluator 114 and/or the location identifier 112 can reference navigation information maintained by the navigation information query log data store 130 to identify starting points for navigation information that terminate at or in a predetermined vicinity of the location 154. In some implementations, navigation information (e.g., directions) may be identified that pass within a predetermined or user specified vicinity of the location associated with the entity. For example, the query log evaluator 114 and/or the location identifier 112 can determine whether a particular set of directions pass by or near the location 154.

Optionally, budget and/or demographic information can be received (406). For example, the information request 152 may include one or more budget and/or demographic parameters specified by the entity 150. Referring to FIG. 2, for example, a representative of the entity (e.g., a coffee shop business) can interact with the user interface 200 and the control 210 to specify information associated with a budget for providing content to users. In the present example, the coffee shop owner may employ the user interface 200 to indicate that a campaign (e.g., an advertising campaign) for providing content (e.g., advertising content including graphical, audio, and/or textual elements) to individuals has a particular budget (e.g., one thousand dollars). Additionally and/or alternatively, for example, the coffee shop owner can interact with the controls 212, 214, and/or 216 to specify one or more parameters that define demographic attributes of individuals to be targeted by the campaign. In the present example, the coffee shop owner may employ the user interface 200 to indicate that the campaign's target demographic includes individuals aged eighteen to thirty-five.

Information associated with the starting points can be aggregated (408). For example, the information aggregator 116 can aggregate starting point information identified by the query log evaluator 114 and/or the location identifier 112. In some implementations, aggregating information may include aggregating starting points by one or more regions. The aggregated information providing system 110 can use the location identifier 112, for example, to identify starting point locations, and to determine in which region (e.g., postal code, district, neighborhood, or other sort of region) the starting points are located. Regions may be specified by the aggregated information providing system 110 and/or by entities interacting with the system 110, for example. As part of an aggregation process, for example, the information aggregator 116 can group the starting points into regions, can count the number of starting points included in each region, and can determine a proportion of the starting points grouped in each region.

In some implementations, aggregating information associated with starting points may include using one or more demographic parameters specified by the entity to filter the navigation information. For example, the navigation information query log data store 130 may include data keys for associating navigation information requested by users with demographic information stored and maintained by the demographic information data store 132. Such demographic information may include profile data provided by and/or inferred about particular users, for example. In the present example, if a representative (e.g., the owner) of the entity 150 (e.g., the coffee shop) is interested in aggregated starting point information for users of a particular age range (e.g., eighteen to thirty-five), the representative may specify a target age range using the control 212 (shown in FIG. 2). Based on the specified parameter (e.g., an age range), for example, the query log evaluator 114 may filter data provided by the navigation information query log data store 130 to identify navigation information including directions which terminate at or near the location 154 (e.g., a storefront) associated with the entity 150 (e.g., the coffee shop), and which were requested by users with an attribute matching the parameter (e.g., the age range). Thus, in the present example, starting point information may be aggregated and provided from navigation information requested by individuals having particular demographic attributes.

In some implementations, demographic information associated with each region may be identified, and aggregated starting point information may include the demographic information. For example, the information aggregator 116 can access demographic information maintained by the demographic information data store 132, and can integrate the starting point information aggregated for each region with appropriate demographic information (e.g., age, gender, income, etc.) of populations within the regions. By including demographic information, for example, the aggregated information providing system 110 can provide entities with information about regional populations, in addition to providing information about the numbers and proportions of people who come from each region. Moreover, in some implementations, demographic information may be used as a factor in providing entities with spending recommendations.

Aggregated starting point information can be provided (410). For example, the aggregated information providing system 110 can provide the aggregated starting point information 180 to the entity 150. Referring to FIG. 3, for example, an entity representative can interact with the user interface 300 to view information regarding the starting points of individuals having submitted requests for navigation information including directions that terminate at or near the entity location. In the present example, the starting point information is aggregated by region, with a proportion of starting points shown graphically and/or textually. In some implementations, demographic information may be provided for each region. The representative may use the interface 300 to view demographic information associated with each of the regions "ABC", "DEF", and "XYZ", for example, by interacting with (e.g., clicking) the respective presentation controls 302, 304, and 306 to drill down into detailed demographic information for the regions.

Optionally, spending recommendations can be provided (412). For example, the aggregated information providing system 110 can use the recommendation provider 118 to generate and provide spending recommendations to content sponsors regarding spending with respect to campaigns (e.g., advertising campaigns). In the present example, the coffee shop may be a content sponsor of an advertising campaign for promoting products or services of the business, and may be provided with aggregated starting point information via the interface 300 including a listing of top regions where customers come from when visiting the location associated with the entity.

In some implementations, a recommendation may be provided that a budget for providing content to users is divided among different regions relative to the proportion of starting points grouped in each region. For example, based on a specified budget (e.g., one thousand dollars), the recommendation provider 118 can provide a recommendation that the entity 150 (e.g., the coffee shop) divide its budget among regions relative to the proportion of starting points grouped in each of the regions "ABC", "DEF", and "XYZ". Thus, in the present example, regions including locations where a large portion of the coffee shop's current or potential customers originate may receive a proportionally large amount of the coffee shop's promotional budget.

In some implementations, a recommendation may be provided that a portion of the budget is spent for a particular region based at least in part on a proportion of starting points grouped in a region and based at least in part on demographic attributes of individuals within the region. For example, based on a specified budget (e.g., one thousand dollars), the recommendation provider 118 can provide a recommendation that the entity 150 (e.g., the coffee shop) divide its budget based in part on the proportion of starting points grouped in each of the regions "ABC", "DEF", and "XYZ", and based in part on the demographic attributes of individuals and/or populations associated with the regions. For example, based on publically available demographic data, the recommendation provider 118 may determine that region "XYZ" includes a larger than average concentration of high income individuals, and that regions "ABC" and "DEF" include smaller than average concentrations of such individuals. Thus, in the present example, based on a predetermined spending strategy, the recommendation provider 118 may recommend that the coffee shop modify (e.g., increase) its budget for targeting individuals within the region "XYZ" and also modify (e.g., decrease) its budget for targeting individuals within the regions "ABC" and "DEF". Thus, demographic information about populations within regions and/or demographic information about individuals having submitted requests for navigation information may be used for generating and providing spending recommendations.

Figure 5:
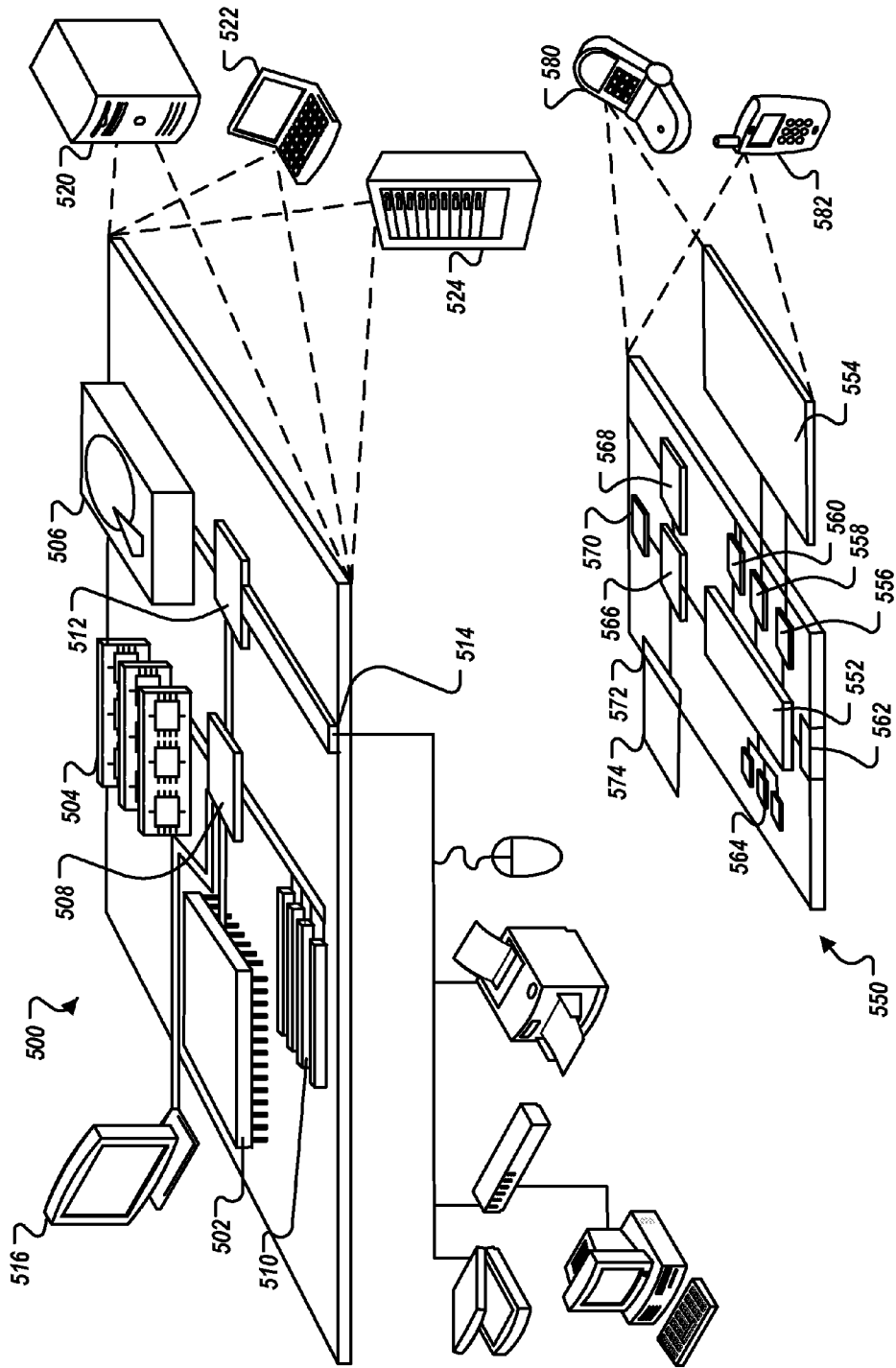
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   identifying, by one or more computing devices, a location associated with an entity;
   accessing, by the one or more computing devices, navigation query logs comprising navigation information providing directions from a starting point to an ending point;
   identifying, by the one or more computing devices, a plurality of navigation requests having an ending point in a predefined vicinity of the location of the entity from the navigation query logs;
   identifying, by the one or more computing devices, a starting point for each of the plurality of navigation requests;
   determining, by the one or more computing devices, aggregated starting point information for the plurality of navigation requests based at least in part on the starting point for each of the plurality of navigation requests, the aggregated starting point information providing a proportion of the starting points grouped in each of the one or more regions; and
   determining a recommendation for allocation of a budget among one or more regions based at least in part on the aggregated starting point information;
   wherein the recommendation specifies that the budget be divided among each of the one or more regions relative to the proportion of starting points grouped in each region.

2. The method of claim 1, wherein the location associated with the entity is an address.

3. The method of claim 1, wherein the predefined vicinity of the location associated with the entity includes a predefined area.

4. The method of claim 1, further comprising obtaining, by the one or more computing devices, one or more demographic parameter selections and wherein determining, by the one or more computing devices, the aggregating starting point information includes filtering the aggregated starting point information to include starting points associated with individuals having demographic attributes matching the one or more demographic parameter selections.

5. The method of claim 1, further comprising identifying demographic information associated with each region and wherein the aggregated starting point information includes the demographic information.

6. The method of claim 1, wherein the budget is an advertising budget.

7. The method of claim 1, wherein the budget is for providing content to users.

8. The method of claim 1, wherein the method further comprises providing for display by one or more computing devices, a user interface that includes the recommendation for allocation of a budget.

9. One or more non-transitory computer readable media encoded with a computer program, the computer program comprising instructions that when executed by one or more computers cause the one or more computers to perform operations, the operations comprising:
   identifying a location associated with an entity;
   accessing navigation query logs comprising navigation information providing directions from a starting point to an ending point;
   identifying a plurality of navigation requests having an ending point in a predefined vicinity of the location of the entity from the navigation query logs;
   identifying a starting point for each of the plurality of navigation requests; and
   determining aggregated starting point information for the plurality of navigation requests based at least in part on the starting point for each of the plurality of navigation requests, the aggregated starting point information providing a proportion of the starting points grouped in each of the one or more regions; and determining a recommendation for allocation of a budget among one or more regions based at least in part on the aggregated starting point information;

wherein the recommendation specifies that the budget be divided among each of the one or more regions relative to the proportion of starting points grouped in each region.

10. The one or more non-transitory computer readable media of claim 9, wherein the location associated with the entity is an address.

11. The one or more non-transitory computer readable media of claim 9, wherein the predefined vicinity of the location associated with the entity includes a predefined area.

12. The one or more non-transitory computer readable media of claim 9, wherein the operations further comprise obtaining one or more demographic parameter selections and wherein determining the aggregating starting point information includes filtering the aggregated starting point information to include starting points associated with individuals having demographic attributes matching the one or more demographic parameter selections.

13. The one or more non-transitory computer readable media of claim 9, wherein the operations further comprise identifying demographic information associated with each region and wherein the aggregated starting point information includes the demographic information.

14. The one or more non-transitory computer readable media of claim 9, wherein the budget is an advertising budget.

15. The one or more non-transitory computer readable media of claim 9, wherein the budget is for providing content to users.

16. The one or more non-transitory computer readable media of claim 9, wherein the operations further comprises providing for display by one or more computing devices, a user interface that includes the recommendation for allocation of a budget.

* * * * *